(12) United States Patent
Raspet et al.

(10) Patent No.: US 6,688,112 B2
(45) Date of Patent: Feb. 10, 2004

(54) THERMOACOUSTIC REFRIGERATION DEVICE AND METHOD

(75) Inventors: Richard Raspet, Oxford, MS (US);
William V. Slaton, Eindhoven (NL);
Craig J. Hickey, Oxford, MS (US);
Robert A. Hiller, Oxford, MS (US);
Henry E. Bass, Salt Lake City, UT (US)

(73) Assignee: University of Mississippi, University, MS (US)

( * ) Notice: Subject to any disclaimer, the term of this patent is extended or adjusted under 35 U.S.C. 154(b) by 0 days.

(21) Appl. No.: 10/277,817

(22) Filed: Oct. 23, 2002

(65) Prior Publication Data

US 2003/0101734 A1 Jun. 5, 2003

Related U.S. Application Data

(60) Provisional application No. 60/334,945, filed on Dec. 4, 2001.

(51) Int. Cl.[7] .................................................. F25B 9/00
(52) U.S. Cl. ............................................................. 62/6
(58) Field of Search .............................. 62/6, 118, 119, 62/467, 515

(56) References Cited

U.S. PATENT DOCUMENTS

| | | |
|---|---|---|
| 4,114,380 A | 9/1978 | Ceperley |
| 4,355,517 A | 10/1982 | Ceperley |
| 4,398,398 A | 8/1983 | Wheatley et al. |
| 4,489,553 A | 12/1984 | Wheatley et al. |
| 4,584,840 A | 4/1986 | Baumann |
| 4,722,201 A | 2/1988 | Hofler et al. |
| 4,858,441 A | 8/1989 | Wheatley et al. |
| 4,953,366 A | 9/1990 | Swift et al. |
| 5,051,066 A | 9/1991 | Lucas |
| 5,165,243 A | 11/1992 | Bennett |
| 5,174,130 A | 12/1992 | Lucas |
| 5,263,341 A | 11/1993 | Lucas |
| 5,303,555 A | 4/1994 | Chrysler et al. |
| 5,349,813 A | 9/1994 | Eisinger |
| 5,489,202 A | 2/1996 | Eisinger |
| 5,515,684 A | 5/1996 | Lucas et al. ................. 62/6 |
| 5,647,216 A | 7/1997 | Garrett |
| 5,673,561 A | 10/1997 | Moss |
| 5,901,556 A | 5/1999 | Hofler |
| 5,953,920 A | 9/1999 | Swift et al. |
| 6,032,464 A | 3/2000 | Swift et al. |
| 6,145,320 A | 11/2000 | Kim |
| 6,164,073 A | 12/2000 | Swift et al. |
| 6,233,946 B1 | 5/2001 | Mastuda |
| 6,248,126 B1 | 6/2001 | Lesser et al. |
| 6,307,287 B1 | 10/2001 | Garrett et al. |
| 6,367,263 B1 | 4/2002 | Scott |
| 2002/0043065 A1 | 4/2002 | Ban et al. ................. 60/320 |

*Primary Examiner*—Timothy L. Maust
*Assistant Examiner*—Malik N. Drake
(74) *Attorney, Agent, or Firm*—Bacon & Thomas, PLLC

(57) ABSTRACT

A thermoacoustic refrigeration device employs a gas-vapor mixture as the working fluid. As a result, the refrigeration device operates according to a modified thermoacoustic refrigeration cycle that adds a condensation-vaporization cycle to the thermoacoustic cycle. The resulting modified refrigeration cycle increases the efficiency of heat transport by harnessing the translational motion of the vapor, as well as the usual acoustic oscillations, to transport the heat energy from one end of a thermal stack to the other.

10 Claims, 2 Drawing Sheets

THERMOACOUSTIC REFRIGERATION DEVICE AND METHOD

This application claims the benefit of provisional application No. 60/334,945, filed Dec. 4, 2001.

BACKGROUND OF THE INVENTION

1. Field of the Invention

This invention relates to improvements in thermoacoustic refrigeration, and in particular to a thermoacoustic refrigeration device which employs a gas-vapor mixture as the working fluid.

The invention also relates to a refrigeration method, and in particular to a thermoacoustic refrigeration method that modifies the conventional thermoacoustic refrigeration cycle by adding condensation and vaporization to the thermoacoustic cycle.

In conventional thermoacoustic refrigeration, heat energy is transported primarily or solely by waves acoustically induced in an inert gas. The waves may be standing waves or traveling waves that oscillate or travel from one side of the thermal stack to the other, but in either case are arranged to exploit the temperature differential between areas of compression and areas of rarefaction relative to a thermal stack or regenerator, the thermal stack transferring heat energy from the cold areas to the hot areas to achieve refrigeration. The purpose of the vaporization-condensation cycle of the invention is to increase the efficiency of heat transport by harnessing the translational motion of the vapor, as well as the usual acoustic oscillations, to transport the heat energy from one end of the thermal stack to the other, i.e., by using acoustic mass transfer as well as acoustic heat transfer to transport heat energy up the heat-absorbing stack.

2. Description of Related Art

The basic principles of thermoacoustic refrigeration have been known for more than a decade. In its most basic form, thermoacoustic refrigeration is a process that utilizes acoustic energy to pump or transport heat through a thermal stack between a cold heat exchanger at one end and a hot heat exchanger at the other end, the acoustic energy being in the form of standing or traveling acoustic waves generated by a loudspeaker or similar moving part to cause the mechanical compression and expansion of a working fluid needed for the cooling cycle.

In all such devices, heat is transported solely by acoustic waves in an inert gas. Since the acoustic wave generator is the only moving part in a thermoacoustic refrigeration device, thermoacoustic refrigeration devices have the potential for greater reliability, smaller size, and lower cost than conventional refrigeration devices. Despite these potential advantages, however, thermoacoustic refrigeration has one substantial disadvantage that has heretofore prevented more widespread application of the technology, namely relatively low cooling power in comparison with conventional vapor cycle refrigeration devices. Essentially, the problem is that the oscillations in temperature resulting from application of an acoustic wave to the inert gas used as a working fluid are relatively small and thus have a limited ability to transfer heat.

The basic standing wave version of the conventional thermoacoustic device, illustrated in FIG. 1, is simply a hollow resonance tube 1 filled with an ordinary inert gas and having a speaker or acoustic driver 2 at one end, a hard termination 3 at the other end, and a dry stack or regenerator 4 sandwiched between hot and cold heat exchangers 5,6. The dry stack or regenerator is composed of a solid material and finely divided into sections or passages with which the working fluid exchanges heat with the solid material. In the case of a standing wave, a temperature differential is established between areas of compression, in which heat is transferred from the working fluid to the thermal stack, and rarefaction, in which heat is transferred from the thermal stack to the working fluid.

Details of the refrigeration device shown in FIG. 1 may be found in T. Hofler, "*Thermoacoustic refrigeration design and performance*," Ph.D. dissertation, Physics Department, University of California at San Diego, 1986, while additional information and background on standing or traveling wave refrigeration devices may be found in U.S. Pat. Nos. 4,114,380 (Ceperley); 43,555,517 (Ceperley); 4,398,398 (Wheatley et al.); 4,489,553 (Wheatley et al.); 4,722,201 (Hofler et al.); 4,858,441 (Wheatley et al.); 4,953,366 (Swift et al.); 5,165,243 (Bennett); 5,647,216 (Garrett); 5,673,561 (Moss); 5,901,556 (Hofler); 6,032,464 (Swift et al.); 6,164,073 (Swift et al.); and 6,233,946 (Matsuda).

The present invention, in contrast, augments the purely acoustic heat transfer of previously proposed thermoacoustic refrigeration devices by adding an evaporation-condensation cycle similar to that of conventional vapor-cycle based refrigeration devices, but without the mechanical complexity of the conventional refrigeration device. This is achieved by mixing vapor with an appropriate gas working fluid, and by permitting the working fluid to locally evaporate and condense on the hot and cold ends or sides of the thermal stack, thereby transferring heat energy by acoustic mass transfer as well as by acoustic heat transfer.

With the proper selection of the gas-vapor mixtures used as working fluids in the thermoacoustic refrigeration devices of the invention, criteria for which are described below, predicted heat pumping power and coefficient of performance relative to the Carnot cycle can be increased for an inert gas-vapor working fluid compared to a similar purely inert gas working fluid.

SUMMARY OF THE INVENTION

It is accordingly an objective of the invention to provide a thermoacoustic refrigeration device that provides improved performance without a substantial increase in complexity.

It is also an objective of the invention to provide a thermoacoustic refrigeration method that increases the heat transfer capability of the thermoacoustic refrigeration device by modifying the conventional thermoacoustic refrigeration cycle to include evaporation and condensation, thereby enlisting translation of vapors as a mechanism for heat transfer in addition to the conventional acoustic heat transfer.

It is a still further objective of the invention to provide criteria for selecting a gas-vapor mixture that can be used in a thermoacoustic refrigeration device in order to increase performance by making use of translating vapor to carry heat energy, and condensation of the vapor to transfer the heat energy to the refrigeration stack.

According to a preferred embodiment of the invention, the thermoacoustic refrigeration device of the invention may include, as in a conventional thermoacoustic refrigeration device, a resonance tube filled with a working fluid, an acoustic driver at one end, a hard termination at the other end, a thermal stack situated within the tube and made up of a finely divided structure composed of a solid material, and cold and hot heat exchangers at opposite ends of the stack. Unlike the inert gas of the conventional device, however, the working fluid employed by the refrigeration device of the preferred embodiment is a gas-vapor mixture, the stack is composed of a solid material that is wettable by condensed vapor, and means are provided to return condensed vapor from the cold side of the stack to the hot side. The return means may be a pump or, for simplicity, a wick.

Alternatively, the stack may be arranged to permit return solely or primarily by gravity.

The method of the preferred embodiment of the invention modifies conventional thermoacoustic cooling, which simply involves generating acoustic waves in the working fluid, by modifying the thermoacoustic refrigeration cycle to include at least the following steps:

a. In response to an applied acoustic wave, a parcel of gas in the working fluid is caused to undergo translation along the stack and consequent acoustic compression, thereby decreasing the parcel's volume and increasing its temperature;

b. The decreased volume and increased temperature increases the partial pressure of the vapor within the parcel;

c. The parcel then slows, stops, and reverses its translational motion, while at the same time exchanging heat and vapor with the stack as a result of the parcel's increased temperature relative to the stack;

d. At the time of reversal, the increased partial pressure relative to the vapor pressure at the stack wall causes vapor to condense from the parcel to the stack plate;

e. The gas parcel then undergoes acoustic rarefaction and is translated back past the ambient position, increasing its volume and decreasing its temperature;

f. The acoustic rarefaction in turn causes a decrease in partial pressure of vapor within the parcel;

g. The parcel again slows, stops and reverses its translational motion while exchanging heat and vapor with the stack, this time absorbing heat from the stack;

h. Since the partial pressure of the vapor in the parcel is lower than the vapor pressure at the stack wall, the vapor will evaporate to the parcel from the liquid layer coating the stack.

Because of the modifications to the conventional thermoacoustic refrigeration cycle, heat is transported from one end of the stack to the other, both as a result of the temperature differentials resulting from compression and rarefaction of the gas, and as a result of vapor moving up the stack and exchanging heat at each end.

The performance of the refrigeration device of the preferred embodiment depends on the characteristics of the gas-vapor mixture. According to another aspect of the invention, the gas-vapor mixture is chosen to:

a.) maximize the amount of heat carried by mass relative to the amount of heat carried by thermal effects, represented by $\epsilon_D$ defined by the relationship:

$$\varepsilon_D = \frac{1}{c_p} \frac{\rho_2^o}{\rho_o} \frac{n_o}{n_1^o} \frac{\gamma}{\gamma-1}(s_{mix} - s_{liquid}),$$

where $\rho_2^o$ is the mass density of the vapor in the mixture, $\rho_o$ is the mass density of the mixture, $n_o$ is the number density of the mixture, $n_1^o$ is the number density of the inert gas, $s_{mix}$ is the entropy per unit mass of the mixture $S_{liquid}$ the entropy per unit mass of the condensed liquid, and $c_p$ is the heat capacity at constant pressure per unit mass of the mixture and, b.) minimize the heat transfer coefficient W defined by the relationship:

$$\varphi = \frac{\gamma-1}{\gamma} \frac{l}{R_o T_o},$$

where $\gamma$ is the ratio of the specific heats of the gas and of the mixture; 1 is the latent heat of vaporization of the mixture per mole, $T_o$ is the ambient temperature, and $R_o$ is the universal gas constant. This parameter controls the critical gradient and therefore the stack length necessary to produce a given temperature difference.

Although a particular standing wave device is illustrated herein, those skilled in the art will appreciate that the device and the method of the invention may also be applied to traveling wave refrigeration techniques, and that the simple tube, stack, and heat exchange structure of the illustrated embodiment may be freely varied by those skilled in the art in accordance with the principles described in any of the above references, without departing from the scope of the invention, so long as the modified device employs a gas-vapor mixture as the working fluid.

BRIEF DESCRIPTION OF THE DRAWINGS

FIG. 2b is a graph of the normalized cooling power for the inert gas-vapor mixtures whose coefficient of performance is plotted in FIG. 2a.

DETAILED DESCRIPTION OF THE PREFERRED EMBODIMENTS

Figures 1A, 1B:
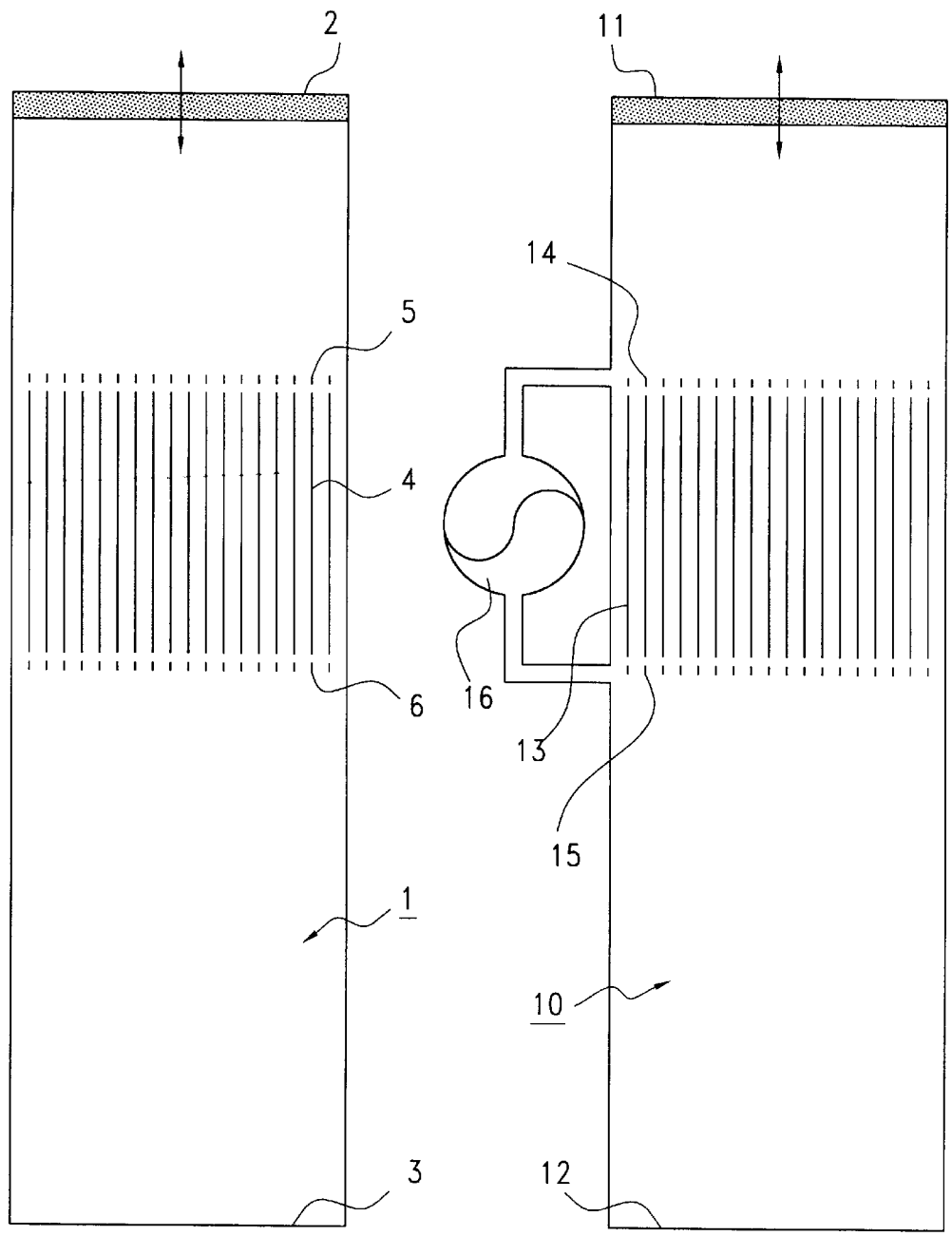
FIG. 1a is a schematic diagram of a conventional standing wave-type thermoacoustic refrigeration device.
FIG. 1b is a schematic diagram of a thermoacoustic refrigeration device constructed in accordance with the principles of a preferred embodiment of the invention.

As illustrated in FIG. 1b, which is a conceptual drawing of a refrigeration device constructed according to the principles of a preferred embodiment of the invention, the thermoacoustic refrigeration device of the preferred embodiment may include a resonance tube 10 filled with a working fluid, an acoustic driver 11 at one end, a hard termination 12 at the other end, a thermal stack 13 situated within the tube and made up of a finely divided structure composed of a solid material, and respective cold and hot heat exchangers 14,15 at opposite ends of the stack. The heat exchangers may include conduits not shown) through which are supplied hot and cold liquids, or any other heat conducting structure, for the purpose of transporting heat away from the thermal stack, in the manner of a conventional heat exchanger. The working fluid employed by the refrigeration device of the preferred embodiment is a gas-vapor mixture whose composition meets the criteria described below, while the stack is composed of a solid material that is wettable by condensed vapor such that a thin sheet of liquid will cover the stack. Finally, means are provided to return condensed vapor from the cold side of the stack to the hot side. The return means may be a pump 16, as illustrated or, for simplicity, a wick. Alternatively, the stack may be arranged to permit return solely or primarily by gravity.

According to the preferred embodiment of the invention, a modified thermoacoustic refrigeration cycle, including vaporization and condensation steps, is provided as follows:

a. In response to an acoustic wave applied by acoustic driver 11, a parcel of gas in the working fluid is caused to undergo translation along the stack and consequent acoustic compression, thereby decreasing the parcel's volume and increasing its temperature;

b. The decreased volume and increased temperature increases the partial pressure of the vapor within the parcel;

c. The parcel then slows, stops, and reverses its translational motion, while at the same time exchanging heat and vapor with the stack 13 as a result of the parcel's increased temperature relative to the stack;

d. At the time of reversal, the increased partial pressure relative to the vapor pressure at the stack wall causes vapor to condense from the parcel to the adjacent stack plate;
e. The gas parcel then undergoes acoustic rarefaction and is translated back past the ambient position, increasing its volume and decreasing its temperature;
f. The acoustic rarefaction in turn causes a decrease in partial pressure of vapor within the parcel;
g. The parcel again slows, stops and reverses its translational motion while exchanging heat and vapor with the stack, this time absorbing heat from the stack;
h. Since the partial pressure of the vapor in the parcel is lower than the vapor pressure at the stack wall, the vapor will evaporate to the parcel from the liquid layer coating the stack.

This thermodynamic cycle describes how an inert gas-vapor working fluid will transport heat and vapor from one end of the stack to the other. The vapor is chosen so that the stack remains wet over the temperature range of interest. With the properly chosen inert gas and condensing vapor, heat energy is carried up the stack by acoustic mass transfer as well as by acoustic heat transfer. The vapor moving up the stack condenses on the walls of the stack and will be returned either by gravity or by an external wicking arrangement or pump 16.

The equations describing acoustic propagation in an inert gas-vapor mixture in a thermoacoustic stack are the acoustic wave equation and the heat pumping equation, both of which are well-known and not further described here. From these equations, figures of merit such as the coefficient of performance and the normalized cooling power may be derived. These figures of merit are used as criteria for selection of the gas-vapor mixture.

The coefficient of performance (COP) is a measure of the efficiency of a refrigerator and is equal to the amount of heat pumped from a cold reservoir divided by the net work input. An upper bound for this efficiency may be calculated by making well-known simplifications to the full acoustic propagation equations. These simplifications include neglecting viscous losses, assuming boundary layer behavior of the acoustic propagation equations and assuming an acoustic standing wave is present; a further simplification may be made by assuming a linear temperature gradient within the stack. The COP relative to the Carnot efficiency for an inert gas-vapor mixture with the above simplifications is then, $$COPR = \Gamma \frac{\delta_T(1-\Gamma) + \varepsilon_D \delta_D(1-\varphi\Gamma)}{\delta_T(1-\Gamma) + \frac{\gamma}{\gamma-1}\frac{n_2^o}{n_1^o}\delta_D(1-\varphi\Gamma)},$$

where $\Gamma$ is the actual temperature gradient across the stack normalized by the dry critical temperature gradient, $\delta_T$ and $\delta_D$ are the thermal and diffusion penetration depths within the mixture, $\gamma$ is the ratio of specific heats for the mixture, $n_1^o$ and $n_2^o$ are the number densities of the inert gas and vapor respectively. The heat transfer coefficient $\varphi$ is defined by the relationship:

$$\varphi = \frac{\gamma-1}{\gamma}\frac{l}{R_o T_o},$$

where $\Gamma$ is the ratio of the specific heats of the gas and of the mixture; l is the latent heat of vaporization of the mixture per mole, $T_o$ is the ambient temperature, and $R_o$ is the universal gas constant. An expression that describes the relative amount of heat transported by thermal or mass diffusion effects is, $$\varepsilon_D = \frac{1}{c_p}\frac{\rho_2^o}{\rho_o}\frac{n_o}{n_1^o}\frac{\gamma}{\gamma-1}(s_{mix} - s_{liquid}),$$

where $\rho_2^o$ is the mass density of the vapor in the mixture, $\rho_o$ is the mass density of the mixture, $n_o$ is the number density of the mixture, $n_1^o$ is the number density of the inert gas, $s_{mix}$ is the entropy per unit mass of the mixture $S_{liquid}$ the entropy per unit mass of the condensed liquid, and $c_p$ is the heat capacity at constant pressure per unit mass of the mixture.

The expression for the idealized COPR may now be considered in more detail. If there is no vapor within the gas mixture the $\varepsilon_D$ and $n_2^o$ terms go to zero and the expression reduces to the accepted idealized efficiency for a dry thermoacoustic refrigerator. It is also clear from the expression for the ideal COPR for an inert gas-vapor mixture that the efficiency will be increased relative to a comparable dry mixture for values of the normalized temperature gradient between zero and $1/\phi$ and if $\varepsilon_D$ is greater than $$\frac{\gamma}{\gamma-1}\frac{n_2^o}{n_1^o}.$$

Figure 2A:
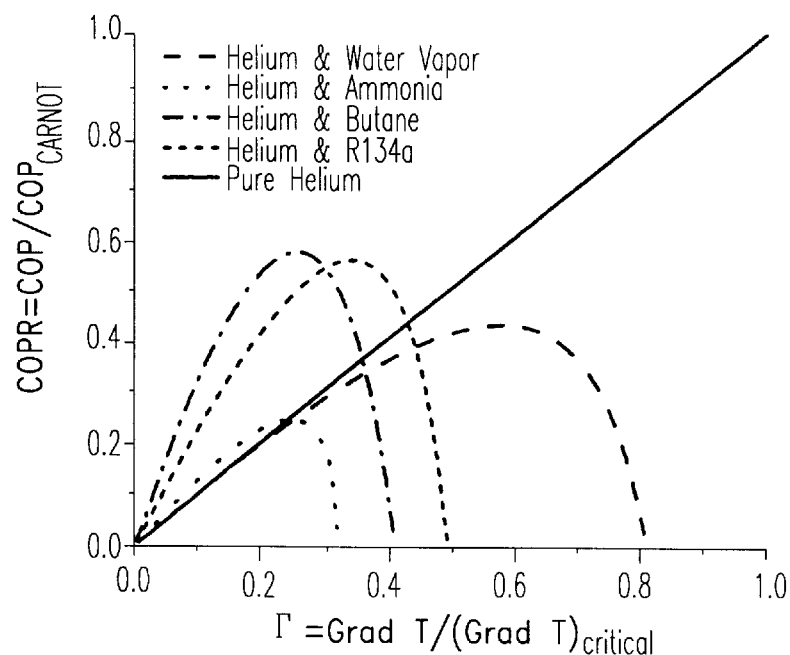
FIG. 2a is a graph of the ideal coefficient of performance relative to Carnot plotted against the normalized temperature gradient.

This expression for the ideal coefficient of performance relative to Carnot for 5 different working fluids as a function of the normalized temperature gradient is depicted in FIG. 2a. The thermal properties of the working fluids, such as density, number density, and specific heat, were calculated using well-known formula from gas property handbooks, further the mean pressure is assumed to be a constant at 10 bar for all working fluids. Since the numerator of the idealized efficiency represents the heat pumped from a cold reservoir the working fluid properties in the numerator are evaluated at a temperature of 280 K (7° C.), while the denominator of the idealized efficiency represents the work required to pump this heat from a hot thermal reservoir at 310 K (37° C.) and so the working fluid properties in the denominator are evaluated at an average temperature of 295 K (22° C.).

FIG. 2a indicates that the idealized efficiency is increased for helium-condensing vapor working fluids compared to a pure helium working fluid at low values of the normalized temperature gradient. For the helium-butane and helium-R134a working fluids at low values of $\Gamma$ the idealized efficiency may be increased by a factor of 3. FIG. 2a also demonstrates the dependence of the COPR on the value of $\phi$ for the working fluids under consideration. The COPR of the inert gas-vapor working fluid is greater than the dry COPR as long as the normalized temperature gradient lies between zero and $1/\phi$.

A further figure of merit for an inert gas-vapor thermoacoustic refrigerator is an expression for the normalized cooling power given by, $$|\bar{Q}_c|_{Normalized} = \frac{\rho_0 c^3[(1-\Gamma) + \varepsilon_D(1-\varphi\Gamma)]}{(\rho_0 c^3)_{Helium}},$$

where c is the speed of sound in the working fluid and other variables are the same as defined before. Standard assumptions were used to derive this formula such as assuming a constant acoustic Mach number and assuming the ratio of the thermal penetration depth in the working fluid to the characteristic open dimension within the stack is the same for the wet and dry working fluids.

Figure 2B:
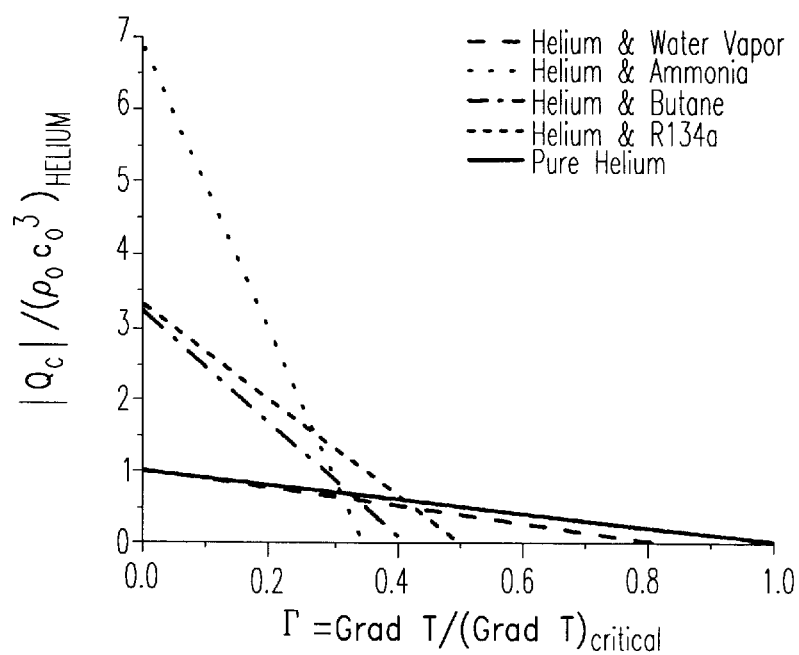

The normalized cooling power for various working fluids is depicted in FIG. 2b as a function of the normalized temperature gradient. The working fluids considered in this calculation are the same as those shown in FIG. 2a. The thermal properties of the working fluids are calculated using standard formula from gas property handbooks at a mean pressure of 10 bar and an ambient temperature of 280K (7° C.). The normalized cooling power for the helium-butane and helium-R134a working fluids at low values of $\Gamma$ is approximately a factor of 3 greater than the pure helium working fluid. FIGS. 2a and 2b when taken together demonstrate that for properly chosen inert gas-vapor working fluids the idealized efficiency and normalized cooling power will be increased compared to a dry working fluid as long as the normalized temperature gradient lies between zero and $1/\phi$.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

We claim:

1. A thermoacoustic refrigeration device, comprising:
   a housing arranged to contain a working fluid;
   an acoustic driver arranged to induce acoustic waves in aid working fluid; and
   a thermal stack situated within the housing and arranged to transfer heat energy from the working fluid to a hot heat exchanger, and to supply heat energy from a cold heat exchanger to the working fluid,
   wherein the working fluid is a gas-vapor mixture, and
   wherein the stack is wettable by condensed vapor such that vapor condenses on the stack during a refrigeration cycle in order to expedite said transfer of each energy from the working fluid to the hot heat exchanger.

2. A thermoacoustic refrigeration device as claimed in claim 1, wherein said stack is a finely divided structure composed of a solid material and having a length that is less than a wavelength of said waves.

3. A thermoacoustic refrigeration device as claimed in claim 1, wherein said housing includes a hard termination at an end opposite an end where the acoustic driver is situated, and wherein said acoustic waves are standing waves.

4. A thermoacoustic refrigeration device as claimed in claim 1, wherein said working fluid is selected to:
   a. maximize the amount of heat carried by mass relative to the amount of heat carried by thermal effects, represented by $\epsilon_D$ defined by the relationship:

$$\varepsilon_D = \frac{1}{c_p} \frac{\rho_2^o}{\rho_o} \frac{n_o}{n_1^o} \frac{\gamma}{\gamma - 1} (s_{mix} - s_{liquid}),$$

where $\rho_2^o$ is the mass density of the vapor in the mixture, $\rho_o$ is the mass density of the mixture, $n_o$ is the number density of the mixture, $n_1^o$ is the number density of the inert gas, $s_{mix}$ is the entropy per unit mass of the mixture $S_{liquid}$ the entropy per unit mass of the condensed liquid, and $c_p$ is the heat capacity at constant pressure per unit mass of the mixture and, b. minimize the heat transfer coefficient $\phi$ defined by the relationship:

$$\varphi = \frac{\gamma - 1}{\gamma} \frac{l}{R_o T_o},$$

where $\gamma$ is the ratio of the specific heats of the gas and of the mixture; l is the latent heat of vaporization of the mixture per mole, $T_o$ is the ambient temperature, and $R_o$ is the universal gas constant. This parameter controls the critical gradient and therefore the stack length necessary to produce a given temperature difference.

5. A thermoacoustic refrigeration device as claimed in claim 1, further comprising return means for transporting condensed vapor from one end of said stack to the other.

6. A thermoacoustic refrigeration device as claimed in claim 5, wherein said return means is an external wick.

7. A thermoacoustic refrigeration device as claimed in claim 5, wherein said return means is an external pump.

8. A thermoacoustic refrigeration device as claimed in claim 1, wherein said condensed vapor is arranged to return to an opposite side of the stack by force of gravity.

9. A thermoacoustic refrigeration method, comprising the steps of:
   acoustically driving a working fluid to cause waves in the working fluid to transport heat energy from one side of a thermal stack to the other side;
   evaporating a vapor in the working fluid to increase heat transfer to the working fluid at one end of the stack; and
   condensing the vapor to increase heat transfer from the working fluid at a second end of the stack.

10. A thermoacoustic refrigeration method, comprising the following refrigeration cycle:
   a. an acoustic wave applied by an acoustic driver causes a parcel of gas in a working fluid to undergo translation along a thermal stack and consequent acoustic compression, thereby decreasing the parcel's volume and increasing its temperature;
   b. the decreased volume and increased temperature increases the partial pressure of the vapor within the parcel;
   c. the parcel then slows, stops, and reverses its translational motion, while at the same time exchanging heat and vapor with the stack as a result of the parcel's increased temperature relative to the stack;
   d. at the time of reversal, the increased partial pressure relative to the vapor pressure at the stack wall causes vapor to condense from the parcel to the adjacent stack plate;
   e. the gas parcel then undergoes acoustic rarefaction and is translated back past the ambient position, increasing its volume and decreasing its temperature;
   f. the acoustic rarefaction in turn causes a decrease in partial pressure of vapor within the parcel;
   g. the parcel again slows, stops and reverses its translational motion while exchanging heat and vapor with the stack, this time absorbing heat from the stack; and
   h. since the partial pressure of the vapor in the parcel is lower than the vapor pressure at the stack wall, the vapor will evaporate to the parcel from the liquid layer coating the stack.

* * * * *

UNITED STATES PATENT AND TRADEMARK OFFICE
CERTIFICATE OF CORRECTION

PATENT NO. : 6,688,112 B2 Page 1 of 1
DATED : February 10, 2004
INVENTOR(S) : Richard Raspet et al.

It is certified that error appears in the above-identified patent and that said Letters Patent is hereby corrected as shown below:

Column 1,
Between lines 5 and 6, insert the following section:

-- STATEMENT REGARDING FEDERALLY SPONSORED RESEARCH

This work was sponsored by the Office of Naval Research under Grant No. NO0014-96-1-0074. The United States government may have certain rights in this invention. --.

Signed and Sealed this

Thirteenth Day of July, 2004

JON W. DUDAS
*Acting Director of the United States Patent and Trademark Office*